US006295534B1

(12) United States Patent
Mann

(10) Patent No.: US 6,295,534 B1
(45) Date of Patent: *Sep. 25, 2001

(54) APPARATUS FOR MAINTAINING AN ORDERED LIST

(75) Inventor: Eytan Mann, Modi'in (IL)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,426

(22) Filed: May 28, 1998

(51) Int. Cl.[7] .................................................. G06F 17/30

(52) U.S. Cl. ............................................. 707/10; 711/147

(58) Field of Search .................................. 707/1, 3, 9, 10, 707/101; 711/147

(56) References Cited

U.S. PATENT DOCUMENTS

| | | | |
|---|---|---|---|
| 5,434,972 | * | 7/1995 | Hamlin .................................. 709/238 |
| 5,745,899 | * | 4/1998 | Burrows ................................ 707/102 |
| 5,950,191 | * | 9/1999 | Schwartz ................................. 707/3 |

* cited by examiner

Primary Examiner—Hosain T. Alam
Assistant Examiner—Jean Bolte Fleurantin
(74) Attorney, Agent, or Firm—Howard Zaretsky; McDonnell Boehnen Hulbert & Berghoff

(57) ABSTRACT

An apparatus for maintaining an ordered list which can store any type and number of data items. The ordered list can be implemented in hardware so as to enable fast, efficient maintenance of an ordered list of data. The data to be stored in the list is stored as a plurality of data cells each comprising any number of bits. The ordered list permits data to be read from, written to and deleted from the list. Data is written to the list using a push operation and data is deleted from the listing using a pop operation. A controller, processor or other source, provides the cell address information for each read, push and pop operation. The ordered list comprises a plurality of index units with each index unit comprising a 3 to 1 multiplexor whose output is connected to a data cell comprising a register or suitable data storage device. The mux selects data to its output from either (1) input cell data (2) the data cell in the previous index unit or (3) the data cell in the next index unit. Individual operations of pushing, popping and reading are defined. In addition, a push operation and a pop operation can be performed simultaneously regardless of whether the push address is greater than, smaller than or equal to the pop address.

17 Claims, 9 Drawing Sheets

| PUSH OPERATION | | |
|---|---|---|
| CELL ADDRESS (INDEX) | MUX SELECT LINE BIT 1 | BIT 0 |
| 0 | 0 | 0 |
| ... | ... | ... |
| PUSH ADDRESS −1 | 0 | 0 |
| PUSH ADDRESS | 1 | 1 |
| PUSH ADDRESS +1 | 0 | 1 |
| ... | ... | ... |
| M | 0 | 1 |

FIG.7

| POP OPERATION | | |
|---|---|---|
| CELL ADDRESS (INDEX) | MUX SELECT LINE BIT 1 | BIT 0 |
| 0 | 0 | 0 |
| ... | ... | ... |
| POP ADDRESS −1 | 0 | 0 |
| POP ADDRESS | 1 | 0 |
| POP ADDRESS +1 | 1 | 0 |
| ... | ... | ... |
| M | 1 | 0 |

FIG.8

| PUSH INDEX > POP INDEX OPERATION ||  |
|---|---|---|
| CELL ADDRESS (INDEX) | MUX SELECT LINE ||
| | BIT 1 | BIT 0 |
| 0 | 0 | 0 |
| ⋮ | ⋮ | ⋮ |
| POP ADDRESS −1 | 0 | 0 |
| POP ADDRESS | 1 | 0 |
| POP ADDRESS +1 | 1 | 0 |
| ⋮ | ⋮ | ⋮ |
| PUSH ADDRESS −2 | 1 | 0 |
| PUSH ADDRESS −1 | 1 | 1 |
| PUSH ADDRESS | 0 | 0 |
| PUSH ADDRESS +1 | 0 | 0 |
| ⋮ | ⋮ | ⋮ |
| M | 0 | 0 |

FIG.9

| PUSH INDEX < POP INDEX OPERATION ||  |
|---|---|---|
| CELL ADDRESS (INDEX) | MUX SELECT LINE BIT 1 | BIT 0 |
| 0 | 0 | 0 |
| ... | ... | ... |
| PUSH ADDRESS −1 | 0 | 0 |
| PUSH ADDRESS | 1 | 1 |
| PUSH ADDRESS +1 | 0 | 1 |
| ... | ... | ... |
| POP ADDRESS −1 | 0 | 1 |
| POP ADDRESS | 0 | 1 |
| POP ADDRESS +1 | 0 | 0 |
| ... | ... | ... |
| M | 0 | 0 |

FIG.10

| PUSH INDEX = POP INDEX OPERATION | | |
| --- | --- | --- |
| CELL ADDRESS (INDEX) | MUX SELECT LINE BIT 1 | BIT 0 |
| 0 | 0 | 0 |
| ⋮ | ⋮ | ⋮ |
| POP/PUSH ADDRESS | 1 | 1 |
| ⋮ | ⋮ | ⋮ |
| M | 0 | 0 |

FIG.11

APPARATUS FOR MAINTAINING AN ORDERED LIST

FIELD OF THE INVENTION

The present invention relates generally to data storage devices and more particularly relates to an apparatus for storing and modifying an ordered list suitable for use in data communications and other equipment.

BACKGROUND OF THE INVENTION

In many applications such as the field of networking, it is highly desirable to maintain a list of items that are ordered in some type of fashion, i.e., alphabetical, numerical, chronological, etc. The list comprises a form of a database wherein small or large amounts of data can be maintained in the ordered list. The fact that the list is maintained as an ordered list enables easy and relatively fast access to large databases of items. For example, many networking device applications need to keep track and store MAC addresses for various reasons such as network bridge applications.

One conventional solution to the problem stores the ordered list in regular memory. A diagram illustrating a prior art example of a block of memory utilized to store and maintain an ordered list of data is shown in FIG. 1. The block of memory 10 comprises a plurality of memory locations 12 numbered 1 through N. Each memory location holds one item of data Data items can be inserted and deleted from the list using push and pop operations. Assuming data is to be inserted at the index point, a push operation functions to move all locations below the index down one space and inserts the new data into the location at the index point. Removing an item from the index location involves reading the location at the index point and then moving all locations below the index up one space.

Note that this prior art scheme can be performed using either software or hardware means. In the case of software, the push and pop operations are time consuming and could take relatively long periods of time to complete as the size of the list increases. Handling large lists in hardware require large number of components to construct the necessary circuitry to perform the push and pop operations.

A second prior art solution to the problem uses a singly or doubly linked list to maintain the ordered list. In a pointer linked list implementation, each data item is combined with one or more pointer fields in which each pointer field functions to store one pointer. In the case of a doubly linked list, two pointers are stored to keep track of both the next data item in the list and the previous data item in the, list. The next and previous pointers are chosen such that they maintain the order in the list.

A diagram illustrating another prior art example of a portion of a doubly linked list utilized to store and maintain an ordered list of data is shown in FIG. 2. The linked list, generally referenced 20, comprises a plurality of structures 22 wherein each structure represents one index. For illustrative purposes, only index #X, #Y and #Z are shown. Each structure 22 comprises a list cell 24 which contains the data to be stored in the list, a next pointer 26 and a previous pointer 28. As shown by the arrows, the next and previous pointers dictate the order of the indexes in the list. For example, the next pointer of index #X points to index #Y and the previous pointer of index Z points to index #Y.

If an item is to be added to the list, the appropriate place of insertion is determined by some process that functions to maintain the ordering scheme. To add an item, the linked list is broken at an appropriate place and the new item placed therein. The linked list is then closed. A diagram illustrating the prior art example shown in FIG. 2 after the insertion of a new index entry is shown in FIG. 3.

The new linked list, generally referenced 30, now comprises a new item—index #M. The ordering mechanism has determined that item #M is to be inserted between index #Y and index #Z. To insert item #M, the next pointer of index #Y is modified to point to index #M and the previous pointer of index #Z is set to point to index #M. Similarly, the next pointer of index #M is set to point to index #Z and the previous pointer of index #M is set to point to index #Y.

A disadvantage of using linked lists, created using either hardware or software, is that locating and reading out a particular entry can be time consuming. In addition, the insert and remove operations can be time consuming as well, especially as the number of entries grows larger and larger. This is due to the fact that to find an entry, the linked list must be traversed link by link. There is no quick random access technique that permits quick reading of any arbitrary data item.

Other prior art schemes of maintaining an ordered list typically implement a hashing scheme or involve some form of content addressable memory (CAM) technique. These techniques also have the disadvantage of requiring relatively large amounts of software and/or hardware resources.

SUMMARY OF THE INVENTION

The present invention is an apparatus for maintaining an ordered list. The list can store any type and number of data items. The ordered list is preferably implemented in hardware so as to enable fast, efficient maintenance of an ordered list of data. The data to be stored in the list, is stored as a plurality of data cells. Each data cell can comprise any number of bits and can be made any size, limited only by the size constraints imposed by the application.

The ordered list permits data to be read from, written to and deleted from the list. Data is written to the list using a push operation and data is deleted from the listing using a pop operation. A controller, processor or other source, provides the cell address information for each read, push and pop operation.

The ordered list comprises a plurality of index units with each index unit comprising a 3 to 1 multiplexor whose output is connected to a data cell. The data cell comprises a register or suitable data storage device. The mux selects data to its output from either (1) input cell data (2) the data cell in the previous index unit or (3) the data cell in the next index unit.

Individual operations of pushing, popping and reading are defined. In addition, a push operation and a pop operation can be performed simultaneously regardless of whether the push address is greater than, smaller than or equal to the pop address.

There is provided in accordance with the present invention an apparatus for storing a, plurality of data items as an ordered list comprising a plurality of index units connected in a linear fashion to form a list of data items, each index unit adapted to receive new data and data from both the next and previous index units and wherein each index unit, except for the first and last, is coupled to a previous and a next index unit, an input data bus adapted to be connected to each index unit in the list, an output data bus adapted to be connected to each index unit in the list and control circuitry adapted to receive a plurality of address and control signals and in response thereto to perform a plurality of operations on the ordered list.

The index unit comprises a multiplexor adapted to receive data from the input bus and data from both its previous and next index units and a data register having an input and an output, the input coupled to the output of the multiplexor, the output coupled to the input of the multiplexor associated with the next index unit, the data register for storing a single data item. The multiplexor may comprise a 3 to 1 multiplexor.

The plurality of control signals comprises a push signal and a pop signal. The plurality of control signals comprises a read signal and the plurality of address signals comprises an address corresponding to on one of the index units.

In addition, the plurality of operations comprises a push operation whereby a new data item is stored in the index unit corresponding to a specified address, comprises a pop operation whereby a data item is removed from the index unit corresponding to a specified address and a read operation whereby data item is read from an index unit corresponding to a specified address.

The control circuitry comprises output circuitry to control the outputting of data from the plurality of index units to the output data bus.

The apparatus further comprises output circuitry adapted to receive an address and a read signal and in response thereto to cause the index unit corresponding to the address to output data stored therein onto the output data bus.

BRIEF DESCRIPTION OF THE DRAWINGS

The invention is herein described, by way of example only, with reference to the accompanying drawings, wherein:

FIG. 7 is a diagram illustrating the mux select lines for a push operation;

FIG. 8 is a diagram illustrating the mux select lines for a pop operation;

FIG. 9 is a diagram illustrating the mux select lines for a simultaneous push/pop operation wherein the push address is greater then the pop address;

FIG. 10 is a diagram illustrating the mux select lines for a simultaneous push/pop operation wherein the push address is smaller then the pop address; and FIG. 11 is a diagram illustrating the mux select lines for a simultaneous push/pop operation wherein the push address is equal to the pop address.

DETAILED DESCRIPTION OF THE INVENTION

Figure 1:
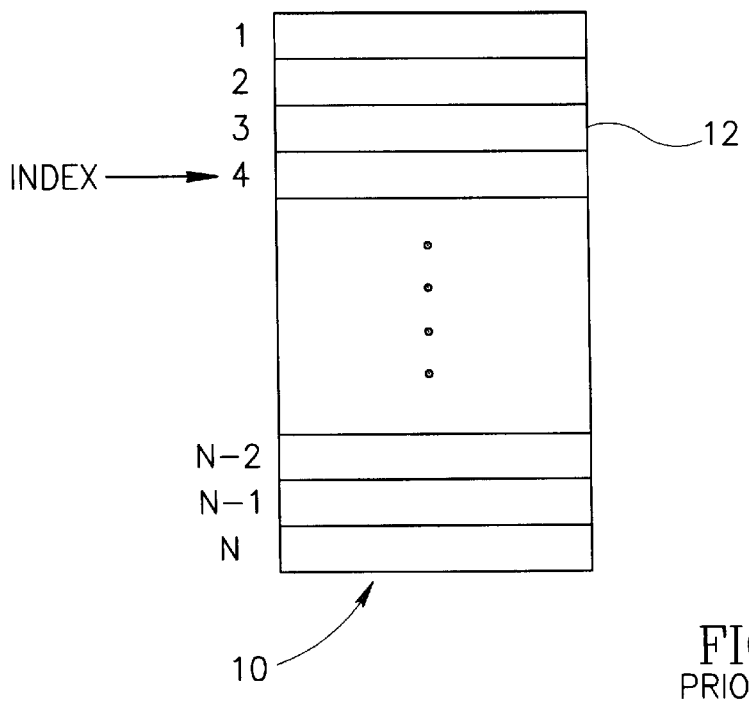
FIG. 1 is a diagram illustrating a prior art example of a block of memory utilized to store and maintain an ordered list of data.
Figure 2:
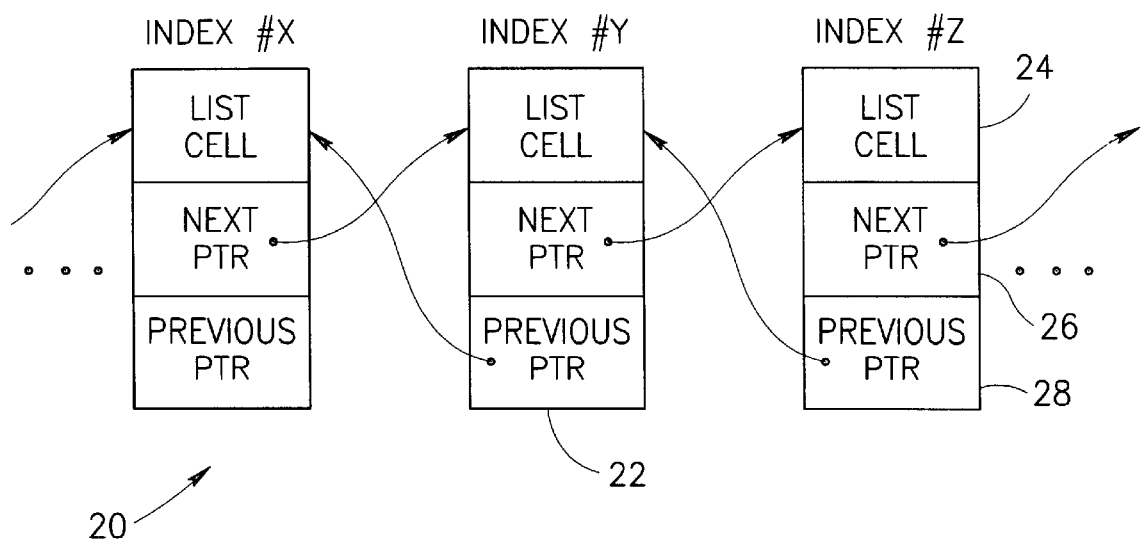
FIG. 2 is a diagram illustrating another prior art example of a portion of a doubly linked list utilized to store and maintain an ordered list of data.
Figure 3:
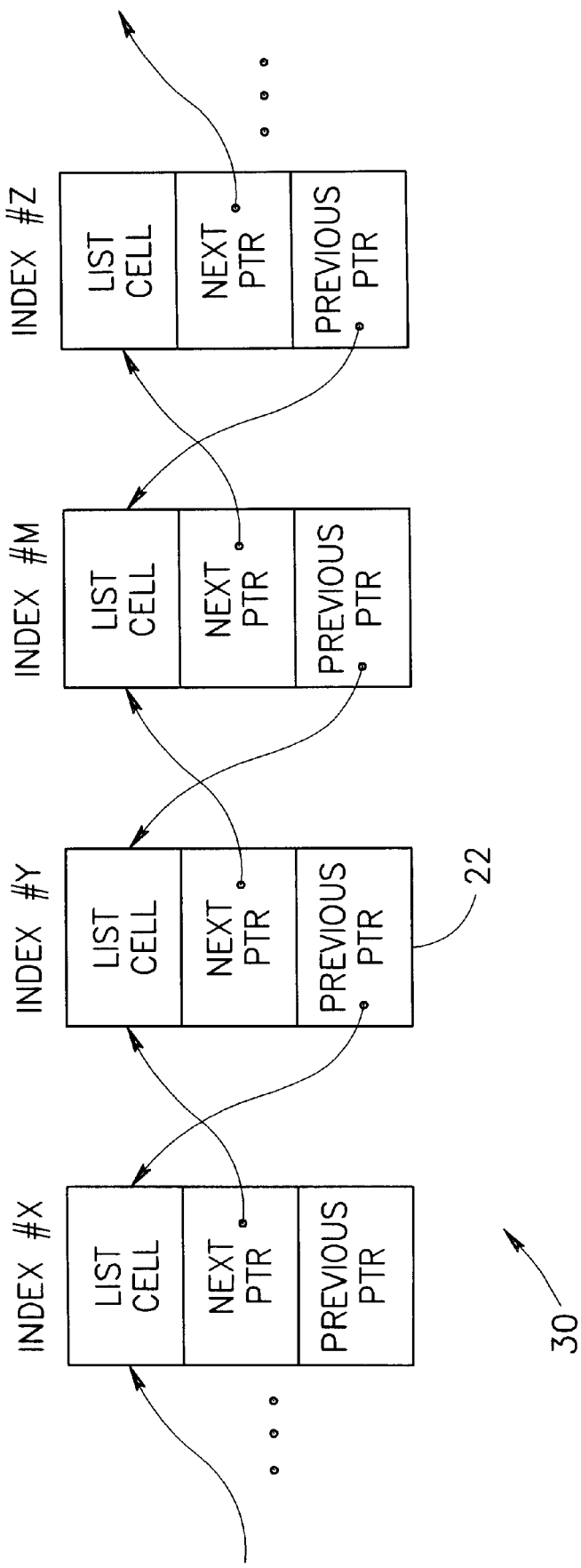
FIG. 3 is a diagram illustrating the prior art example shown in FIG. 2 after the insertion of a new index entry.
Figure 4:
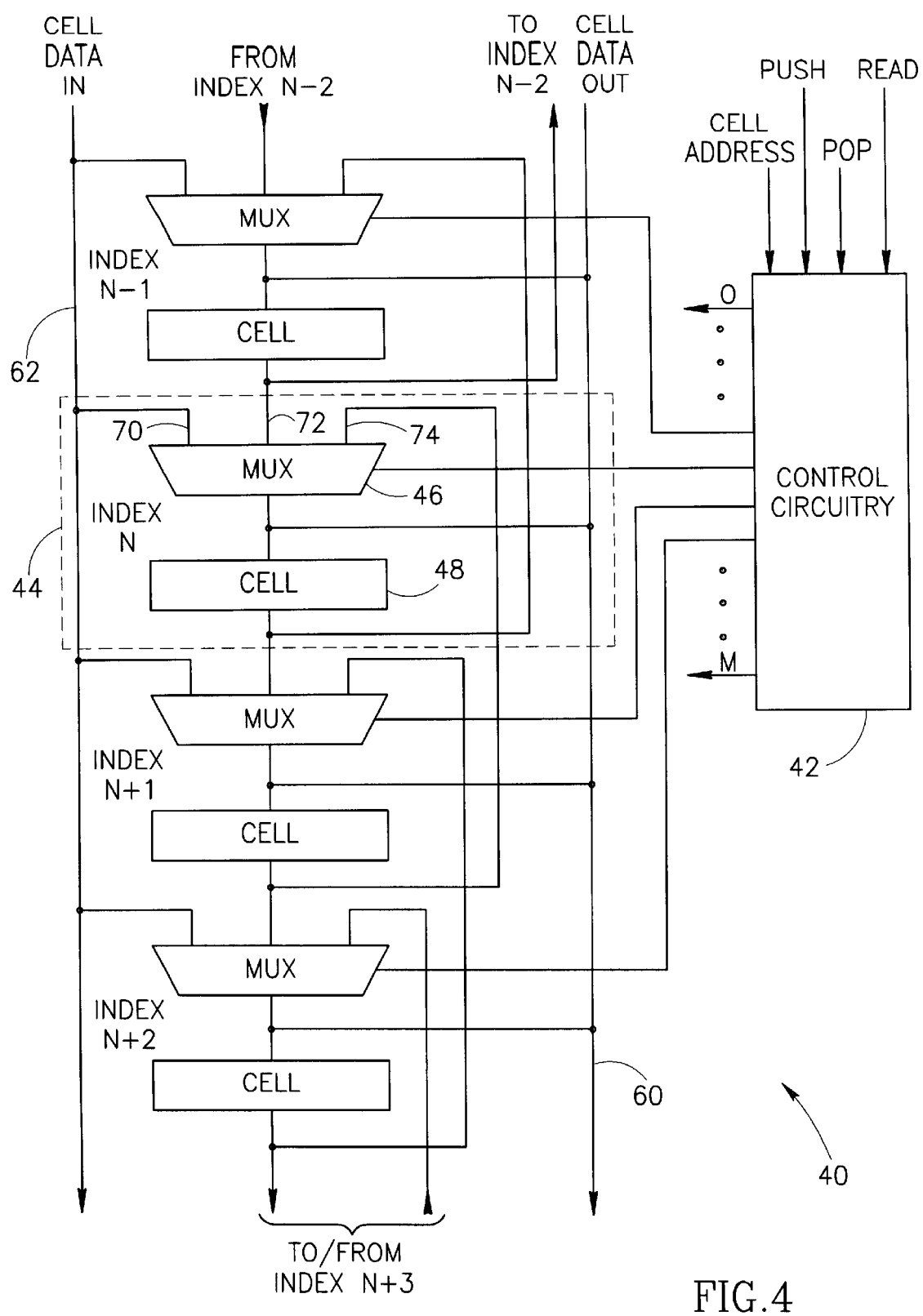
FIG. 4 is a block diagram illustrating an ordered list constructed in accordance with a first embodiment of the present invention.

A block diagram illustrating an ordered list constructed in accordance with a first embodiment of the present invention is shown in FIG. 4. The ordered list, generally referenced 40, comprises a plurality of index units 44 stacked one on top another in linear (i.e. sequential) fashion and control circuitry 42. Each index unit 44 comprises a multiplexor 46 and a data cell 48.

The data cell 48 is a register or memory cell that is used to store an item of data. All the data cells together combine to hold the list of data, e.g., MAC addresses, etc. Each data cell is connected to a multiplexor both above and below the data cell. The multiplexor 46 is a 3 to 1 mux that receives a plurality of control signals from the control circuitry. The plurality of control signals to each multiplexor is represented by a single line for clarity sake. The control signals comprise two select (command) bits, one or more clock signals and an output enable control signal.

The three inputs to each mux (index unit N shown for example) include a first input 70 comprising CELL_DATA_IN bus input 62, a second input 72 comprising the cell data from the previous index and a third input 74 comprising cell data from the next index. The output of each mux is input to the data cell 48 and to the CELL_DATA_OUT bus 60.

The control circuitry 42 functions to receive the cell address, push signal, pop signal and read signal. The control circuitry outputs a plurality of mux control signals designated 0 through M, with M+1 being the number of index units making up the ordered list. The operations that can be performed on the ordered list include push, pop and read. The cell address, provided by a source external to the ordered list, represents the index location for the push, pop or read operation.

The CELL_DATA_IN 62 is the bus the cell element data is provided on that is to be inserted, i.e., pushed, into the ordered list via the push operation. The CELL_DATA_OUT bus 60 represents data read out of one of the data cells via a read operation. Note that in one embodiment, the outputs of all the muxs in the ordered list comprise tri-state outputs and are tied together. If, for example the data cell in index N+1 is to be read, the control circuitry would make the output enable on the mux for index N+2 active. In addition, the control signals input to the mux for index M+2 would be set to select the output of the data cell belonging to index N+1.

Note that the ordered list can operate on a synchronous or asynchronous basis. Preferably, the ordered list operates in synchronous fashion, with all the data cells being clocked simultaneously. The clock signals can be provided by clock circuitry (not shown) or from the control circuitry 42.

Figure 5:
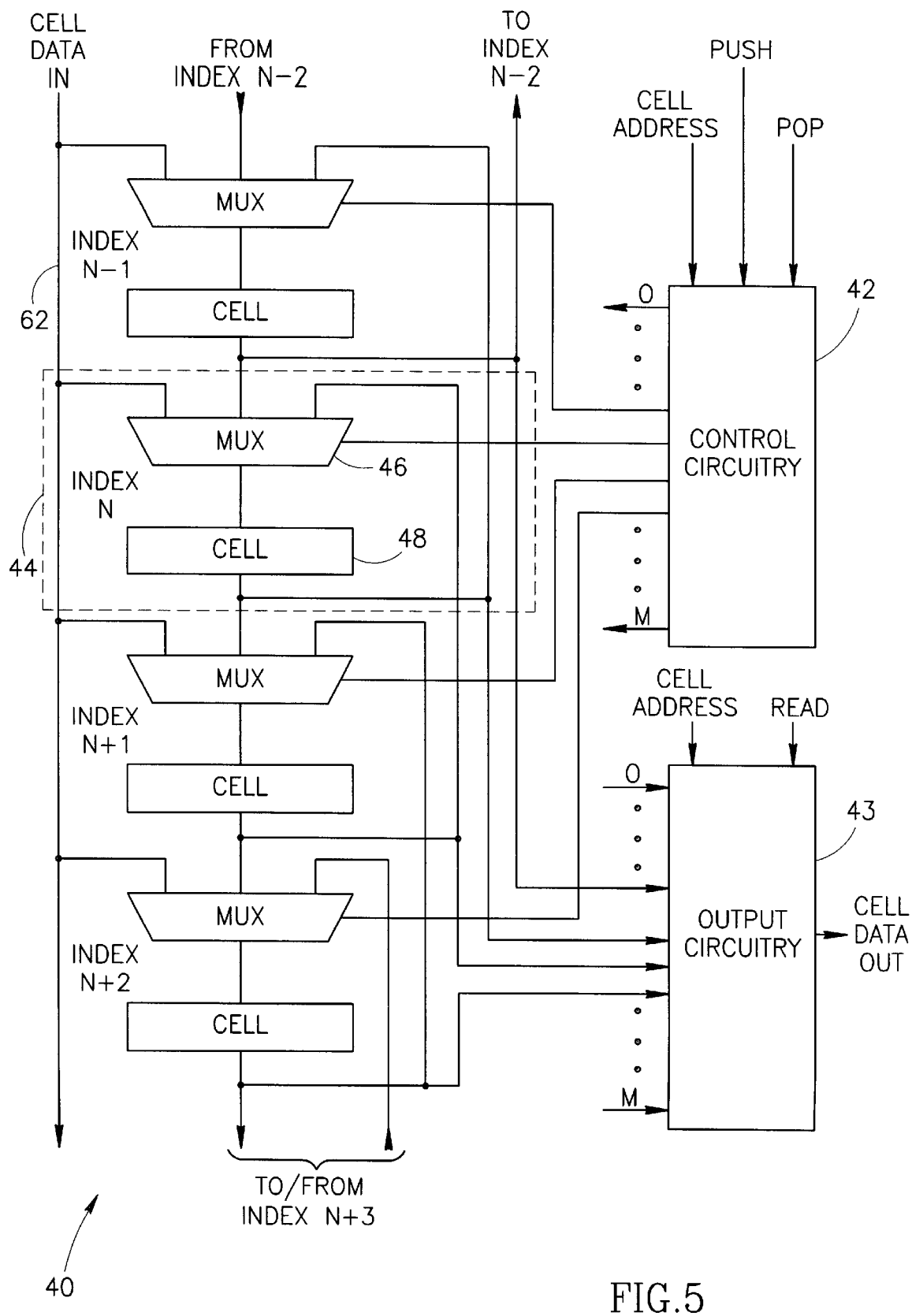
FIG. 5 is a block diagram illustrating an ordered list constructed in accordance with a second embodiment of the present invention.

A block diagram illustrating an ordered list constructed in accordance with a second embodiment of the present invention is shown in FIG. 5. This second embodiment is identical to the first embodiment of FIG. 4 with the addition of output circuitry 43 and the removal of the CELL_DATA_OUT bus. In this second embodiment, cell data is read out by channeling the output of each data cell to a M+1 to 1 multiplexor 43. The cell address and read command signal are input to the output circuitry. In response to a read command, the output circuitry selects the appropriate cell data to output in accordance with the cell address which represents the index to be lead.

Note that the ordered list of the present invention is well suited to be implemented in hardware in order to benefit from its advantages. It may, however, be implemented in other technologies as well. The index unit 44 is optimized to comprise a mux and a data cell. The data cell is a cell, i.e., register, which can hold any type item ranging, for example, from a single bit to an entire multi-byte data record having any arbitrary size. A physical limitation, however, is the number of bits and corresponding traces that can be supported in a particular application.

The three operations include read, push and pop. A reading operation functions to enable a data cell to be read out via the CELL_DATA_OUT bus 60 (FIG. 4) or the output circuitry 43 (FIG. 5). The push operation functions to place a new item, i.e., data cell, into the ordered list in accordance with the cell address. All the items from the cell address index and down are pushed one index ahead. The new cell data is written to the cell address index. The pop operation functions to remove a data cell from the list. The items from the cell address and down are moved up one index.

Figure 6:
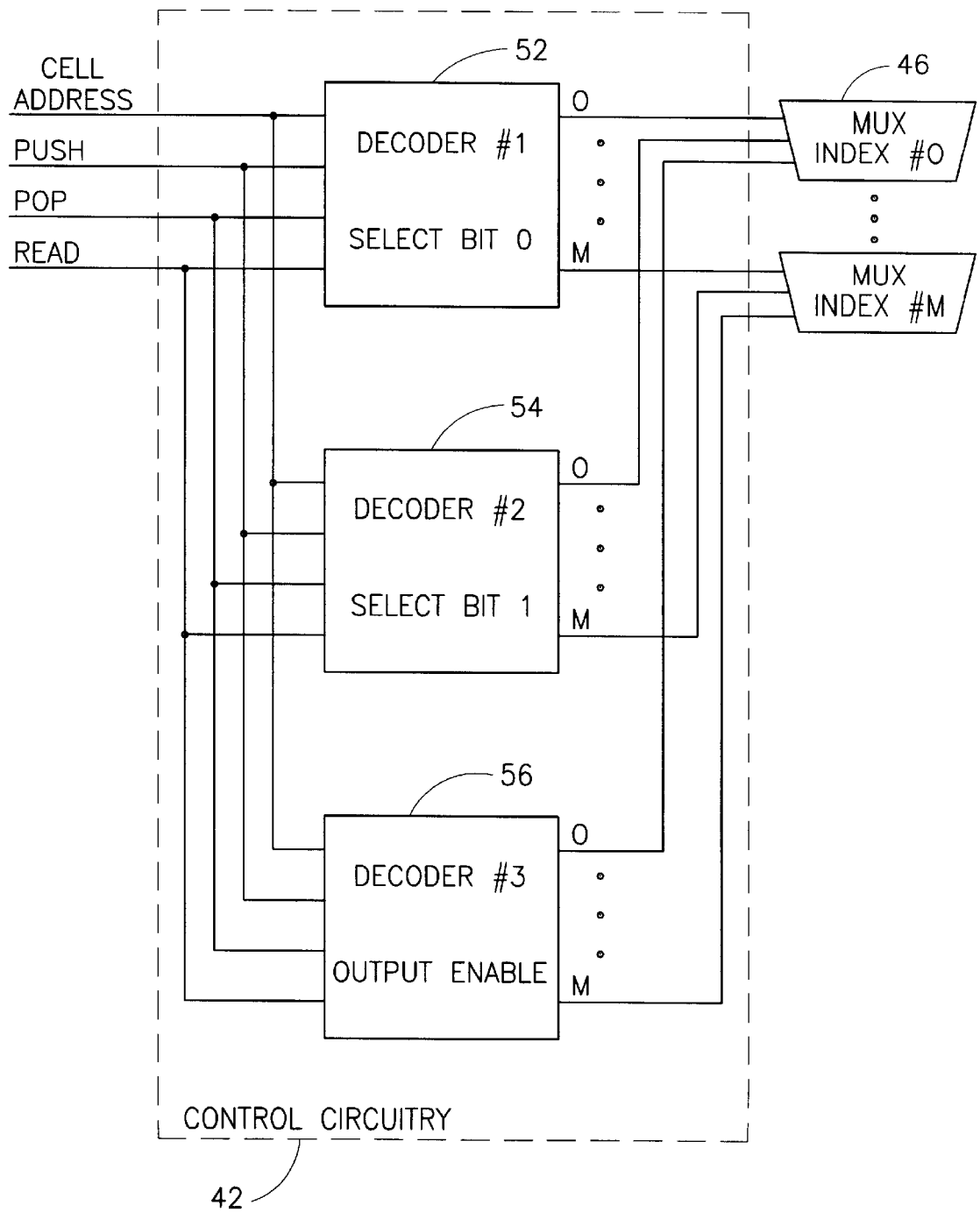
FIG. 6 is a block diagram illustrating the control circuitry portion of the ordered list in more detail.

A block diagram illustrating the control circuitry portion of the ordered list in more detail is shown in FIG. 6. The control circuitry will be described in reference to FIG. 4. Note, however, that the description also to the second embodiment of FIG. 5 with the difference being that the read function is performed by the output circuitry instead.

As described previously, the control circuitry functions to receive the cell address, push, pop and read signals. In response, it generates the appropriate control signals input to each of the M+1 muxes 46. The control circuitry 42 comprises three decoders 52, 54, 56 labeled decoder #1, #2, #3, respectively Decoders #1 and #2 generate the select bit 0 and 1, respectively for the mux control input. Decoder #3 generates the output enable signal in connection with a read operation. The cell address, push, pop and read signals are input to decoders #1, #2 and #3.

In a third embodiment, the control circuitry can be constructed to process one push, pop or read operation at once. In a fourth embodiment, the control circuitry can be constructed to process a pop and a push command simultaneously regardless of the corresponding, cell addresses. In both embodiments the select lines to each mux are defined in Table 1 presented below.

TABLE 1

| Action | Select Line Bit 1 | Bit 0 |
|---|---|---|
| NOP | 0 | 0 |
| get previous | 0 | 1 |
| get next | 1 | 0 |
| CELL_DATA_IN | 1 | 1 |

The third embodiment will be described first with a description of the control signals given with reference to FIG. 7. In a push operation, the indexes from 0 up to one before the push address receive a no operation (NOP) command '00'. The index at the push address writes the CELL_DATA_IN to its data cell (command '11'). Indexes from one after the push address to M write the contents of the previous index's data cell into their data cell (command '01').

A diagram illustrating the mux select lines for a pop operation is shown in FIG. 8.

In a pop operation, the indexes from 0 up to one before the pop address receive a no operation (NOP) command '00'. The indexes corresponding to the pop address write the contents of the next index's cell data into its data cell (command '10'). Likewise, indexes from one after the pop address to M write the contents of the next index's data cell into their data cell (command '10').

In the fourth embodiment, push and pop operations can occur simultaneously regardless of whether the push address is smaller than, greater than or equal to the pop address. The case when the push address is greater then the pop address will be described first. A diagram illustrating the mux select lines for a simultaneous push/pop operation wherein the push address is greater then the pop address is shown in FIG. 9. For this operation, the pop operation is handled similarly as in FIG. 8 but the push operation is simplified as the indexes below the push address do not need to be pushed down due to the pop operation performed in lower memory.

In particular, the indexes from 0 up to one before the pop address receive a NOP command '00'. The indexes from the pop address up to and including two before the push address write the contents of the next index into their data cell (command '10'). The CELL_DATA_IN is written to the data cell at the index one before the push address (command '11'). The indexes from the push address through to M receive a NOP command '00'.

A diagram illustrating the mux select lines for a simultaneous push/pop operation wherein the push address is smaller then the pop address is shown in FIG. 10. For this operation, the push operation is handled similarly as in FIG. 7 but the pop operation is simplified as the indexes below the pop address do not need to be moved up due to the push pop operation performed in lower memory.

In particular, the indexes from 0 up to one before the push address receive a NOP command '00'. The data cell at the index corresponding to the push address is written with the CELL_DATA_IN (command '11'). The indexes from one after the push address up to and including the pop address write the contents of the previous index into their data cell (command '01'). The indexes from one after the pop address to M receive a NOP command '00'.

A diagram illustrating the mux select lines for a simultaneous push/pop operation wherein the push address is equal to the pop address is shown in FIG. 11. When the push and pop address are equal, all the indexes accept for the index at the push/pop address receive a NOP command. The CELL_DATA_IN is written to the data cell of the index at the push/pop address (command '11').

A read operation is performed by applying an output enable signal to the mux in the appropriate index unit. In the first embodiment, only one mux can be enabled at any one time as the outputs of each mux are tri-stated together. In the second embodiment, the multiplexors are enabled all the time.

Note that the principles of the present invention can be extended to include operations that pop multiple cells and push multiple cells simultaneously. To achieve this, however, requires additional hardware components.

While the invention has been described with respect to a limited number of embodiments, it will be appreciated that many variations, modifications and other applications of the invention may be made.

What is claimed is:

1. An apparatus for storing a plurality of data items as an ordered list, comprising:
   a plurality of index units, each index unit storing a single data item, said plurality of index units connected in linear fashion to form a sequential list of data items, each index unit, except for the first and last, coupled to a previous index unit and a next index unit in said list, each index unit having an output and adapted to receive input data from either an input data source, a previous index unit or a next index unit in accordance with a select signal;

a controller adapted to receive a push command or a pop command and a corresponding index address and, in response thereto, to generate independent select signals for each index unit in said list;

wherein in response to said push command, said controller is adapted to generate a first plurality of select signals operative to insert a data item in said list at a location corresponding to said index address; and wherein in response to said pop command, said controller is adapted to generate a second plurality of select signals operative to remove a data item in said list at a location corresponding to said index address.

2. The apparatus according to claim 1, wherein said index unit comprises:

a multiplexor adapted to receive data from said input data source, previous index unit or next index unit; and a data register having an input and an output, said input coupled to the output of said multiplexor, said output coupled to the input of the multiplexor associated with the next index unit, said data register for storing a single data item.

3. The apparatus according to claim 2, wherein said multiplexor comprises a 3 to 1 multiplexor.

4. The apparatus according to claim 1, wherein said push command comprises a push signal generated by an entity external to said controller.

5. The apparatus according to claim 1, wherein said controller is adapted to receive a read signal and, in response thereto, to output a data item from a corresponding index address.

6. The apparatus according to claim 1, wherein said pop command comprises a pop signal generated by an entity external to said controller.

7. The apparatus according to claim 1, wherein said controller is adapted to generate a third plurality of select signals operative to read a data item from an index unit corresponding to the index address in response to a read command receive thereby.

8. The apparatus according to claim 1, wherein said controller comprises output circuitry to control the outputting of data from said plurality of index units.

9. The apparatus according to claim 1, further comprising an output circuit adapted to receive an index address and a read signal, and in response thereto, to cause the index unit corresponding to said index address to output data stored therein.

10. The apparatus according to claim 1, wherein in response to said first plurality of select signals the index unit located at the index address is configured to receive data from the input data source.

11. The apparatus according to claim 1, wherein in response to said first plurality of select signals the index units located above the index address are configured to receive data from their respective previous index units.

12. The apparatus according to claim 1, wherein in response to said second plurality of select signals the index units located at and above the index address are configured to receive data from their respective next index units.

13. The apparatus according to claim 1, wherein said controller is adapted to execute a push command and a pop command simultaneously.

14. The apparatus according to claim 1, wherein said input data source comprises an input data bus connected to each index unit.

15. The apparatus according to claim 1, wherein said output of each index unit is connected to an output data bus.

16. The apparatus according to claim 1, wherein said controller comprises decoder means adapted to generate a plurality of first select lines and a plurality of second select lines, each index unit adapted to receive a first select line and second select line for selecting data from either an input data source, a previous index unit or a next index unit.

17. The apparatus according to claim 1, wherein said controller is adapted to generate said select signal such that an index unit performs a no operation.

* * * * *